United States Patent
Mayer et al.

[15] 3,672,474
[45] June 27, 1972

[54] FLUID FLOW DEVICE FOR A SHOCK ABSORBER

[72] Inventors: Endre A. Mayer; Bernard R. Teitelbaum, both of Birmingham, Mich.

[73] Assignee: The Bendix Corporation

[22] Filed: Feb. 16, 1970

[21] Appl. No.: 11,715

[52] U.S. Cl. .......................... 188/282, 188/311, 188/320
[51] Int. Cl. ............................................ F16f 9/34
[58] Field of Search ................... 188/279, 281, 282, 317, 320

[56] References Cited

UNITED STATES PATENTS

| | | |
|---|---|---|
| 2,821,268 | 1/1958 | DeCarbon........................188/317 X |
| 3,362,508 | 1/1968 | Mayer...............................188/319 |
| 3,314,294 | 4/1967 | Colston..............................137/81.5 X |

Primary Examiner—George E. A. Halvosa
Attorney—John R. Benefiel and Plante, Hartz, Smith and Thompson

[57] ABSTRACT

A fluid flow device which will produce a tailored flow-rate to pressure difference relationship including a laminar and an orifice restriction connected to a radial and a tangential inlet respectively of a vortex valve, with both connected in parallel to the upstream pressure source. Flow across the assemblage will be such that the vortex valve will act like a smaller orifice at lower flows and a larger orifice at higher flows, or vice versa, due to the shifting of the respective shares of the total flow accommodated by the laminar and orifice restrictions. This arrangement is incorporated into a shock absorber to produce an improved output damping characteristic.

7 Claims, 6 Drawing Figures

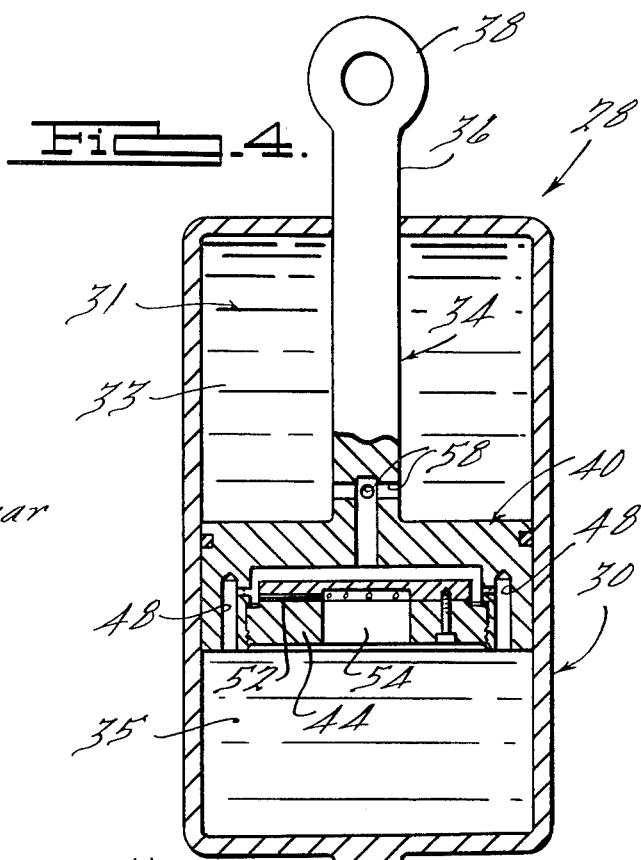
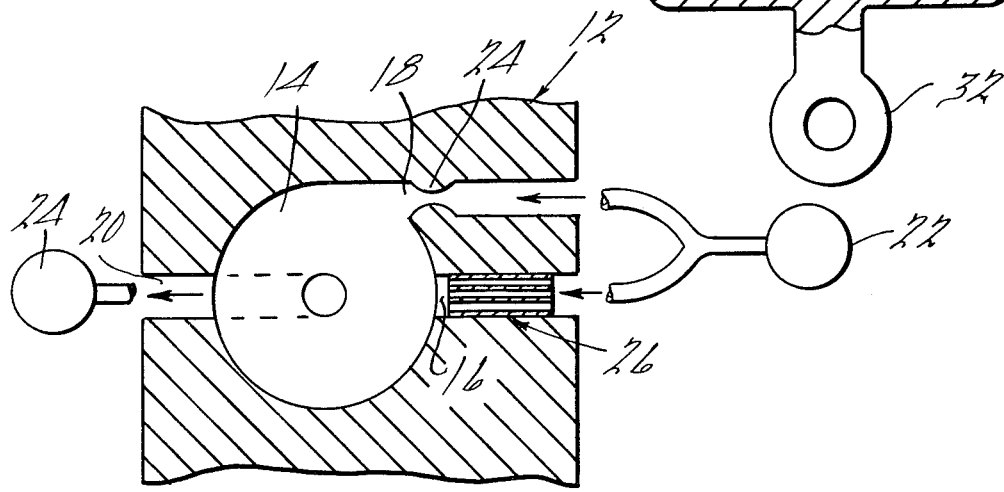

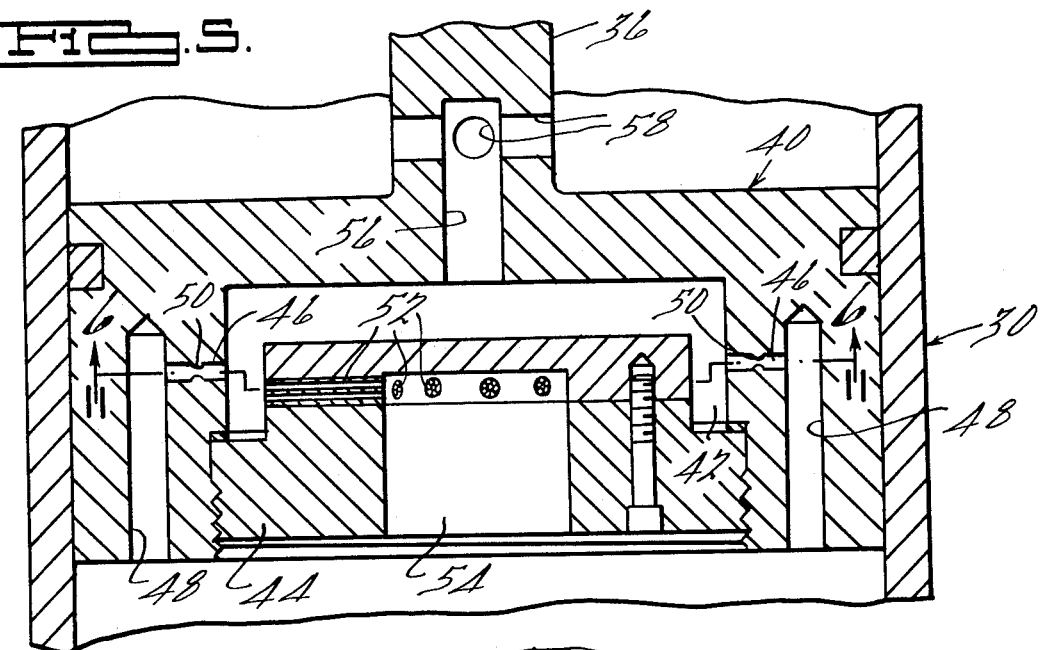
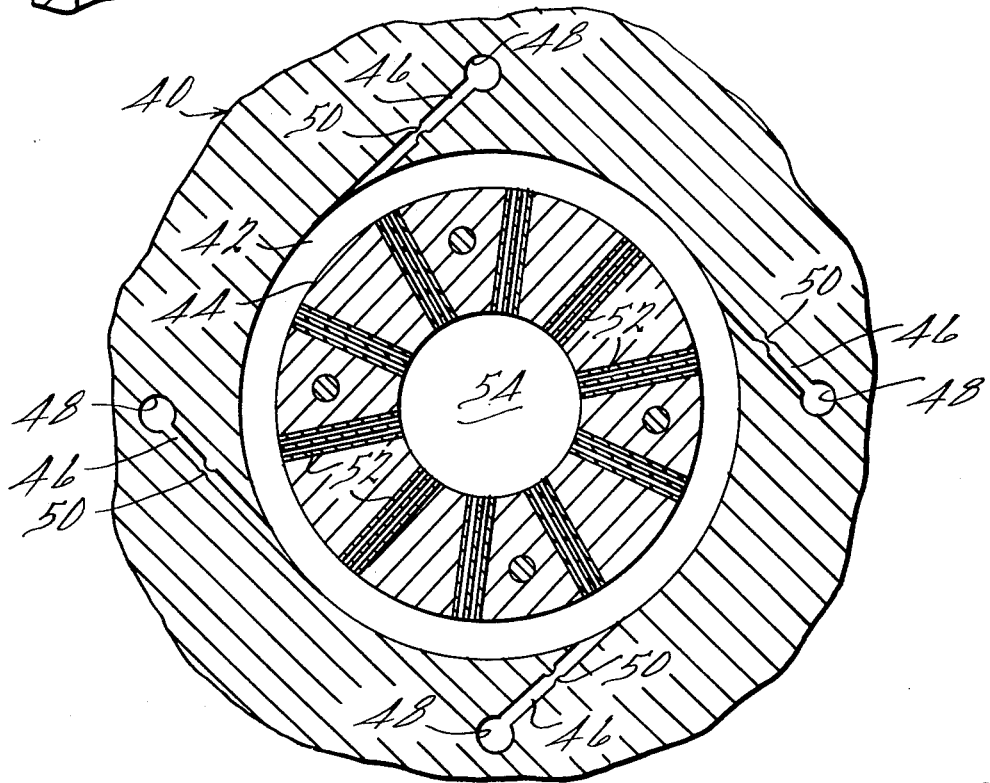

FLUID FLOW DEVICE FOR A SHOCK ABSORBER

BACKGROUND OF THE INVENTION

Conventional shock absorbers for the most part use either orifices or laminar flow passages as flow restrictors in the piston member used to generate the damping force. The flow characteristics of an orifice are such that the flow rate is proportional to the square root of the pressure difference across the orifice. In the case of the laminar flow passage, the flow rate is directly proportional to the pressure difference across the passage. In some conventional shock absorbers, passages are used whose flow versus pressure difference characteristics lie between those of an orifice and a laminar flow passage. In shock absorbers incorporating such flow restrictors, low shock loads induce low flow rates through the restrictors and the low pressure differences developed across the piston provide the correct damping forces. However, when any of these conventional flow restrictor elements are used by themselves in a shock absorber, exceptionally high shock loads tend to induce high flow rates which are accompanied by high pressure differences across the piston. This result leads to undesirably high damping forces being transmitted to the vehicle frame.

This result has been avoided in prior art devices by the incorporation into the shock absorber of mechanical "blow-off" valves to reduce the restrictive effect of the passages at high pressure differences and provide increased flow, but the inclusion of these adds to the cost and has adversely affected the reliability of the device, as well as to increase the maintenance problems involved in servicing the vehicles so equipped.

Therefore, it is an object of the present invention to provide a fluid flow device which will produce a "flattening out" of the flow rate pressure difference relationship at relatively high pressure differences thereacross, without materially increasing the cost or adversely affecting the reliability of the shock absorber device.

It is a further object to provide a simple, reliable shock absorber that produces reduced damping forces over that produced by conventional shock absorbers acting under high shock loads without significantly increasing the cost or complexity of the device.

SUMMARY OF THE INVENTION

These and other objects which will become apparent upon a reading of the following specification and claims are accomplished by providing a vortex valve in the shock absorber piston having a laminar flow restriction connected above the supply port and an orifice restriction connected above the control port thereof. The shifting of flows from the orifice to the laminar restrictor at higher pressure differences creates a "flattening" of the flow rate versus pressure difference function at relatively high pressure differences across the assemblage.

DESCRIPTION OF THE DRAWINGS

FIG. 1 is a plot of the desired relationship between the flow rate and pressure difference.

FIG. 2 is a schematic representation of the fluid flow device according to the present invention.

FIG. 3 is a graphical plot of the pressure difference-flow rate relationship of flow through laminar and orifice restrictions.

FIG. 4 is a front elevation in partial section of a shock absorber incorporating the fluid flow device according to the present invention.

FIG. 5 is a detail view of the shock absorber piston shown in FIG. 4.

FIG. 6 is a view of the section 6—6 taken in FIG. 5.

DETAILED DESCRIPTION

In the following detailed description, certain specific terminology will be resorted to and a specific embodiment described for the sake of clarity and in order to provide a complete understanding of the invention. However, it is to be understood that the invention is not so limited and may be practiced in a variety of forms and embodiments.

Referring to the drawings, FIG. 1 illustrates graphically the desired relationship between flow rate through the piston and pressure difference thereacross in a shock absorber. This includes a flattened portion 10 which indicates a much greater increase in flow rate for increases in pressure differences occurring at relatively high pressure difference levels. This desired relationship minimizes the undesirably high damping forces developed under high frequency shock loads.

A fluid device according to the present invention and having this desired flow characteristic is illustrated schematically in FIG. 2, and indicated at 12. This device includes a vortex valve having a vortex chamber 14 which has in communication therewith a radial supply inlet 16, a tangential control inlet 18 and a central outlet 20. Since the vortex valve is well known in itself, a complete description is not felt to be necessary. Such devices are described in U.S. Pat. Nos. 3,362,508 and 3,424,182.

Suffice it to say, that flow from the source 22 to the outlet 20 for a given pressure at the supply inlet 16 will vary with the pressure applied at the control inlet 18 due to the momentum effects of the swirling flow induced by the control flow, in the manner well known in the prior art.

The present invention includes the addition of an orifice restriction 24 in the control passage 18 and a laminar flow restriction in the radial supply passage 16 with both of these connected in parallel to the pressure source 22. The orifice restriction 24 is designed to be a good converter of fluid potential energy to fluid kinetic energy throughout the pressure difference range encountered between the pressure source 22 and the vortex chamber 14. (This will yield the required square-law relationship between pressure difference and flow rate for the orifice). The laminar restrictor 26 is designed so that laminar flow will occur in the restrictor throughout the same pressure difference range. (This will yield the required proportional relationship between pressure difference and flow rate for the laminar restrictor). The required flow characteristics for the laminar restrictor 26 may be achieved by subdividing the control passage 16 with numerous small tubes to reduce the Reynold's Number in a manner also well known in the prior art.

Since flow through the orifice 24 is a function of the square of the pressure difference, while flow through the laminar restrictor 26 is a linear function of this pressure difference, flow through the control passage 18 will initially be greater than through the laminar restrictor as depicted graphically in FIG. 3. As the pressure difference increases, the orifice offers a greater restrictive effect on flow until the flow through the orifice and the laminar restrictor are equal at "A," and increasing the pressure difference above the value corresponding to this point yields greater flow through the laminar restrictor inasmuch as it then offers less resistance to flow, relative to the orifice.

This shifting of the relative shares of the total flow causes a variation in the overall flow characteristic of the flow assembly since flow into the vortex changer 14 via the control passage 18 creates a much greater overall resistance to flow due to the vortical flow induced thereby. Conversely, flow into vortex chamber 14 via the supply inlet 16 creates much less resistance to flow therethrough due to the absence of this induced vortical flow.

Hence, as the relative shares of the total flow shifts in the above-described manner, the flow through the vortex chamber increases at a more rapid rate with increases in pressure differences above that existing at point "A" in FIG. 3, resulting in a flattening out of the pressure-flow curve across the vortex chamber to obtain the desired pressure-flow relationship.

A shock absorber 28 incorporating this device is shown in FIG. 4. The shock absorber 28 consists of a housing 30 having a chamber therein 31, formed with an attachment 32 secured to one end. A piston assembly 34, having an actuator rod 36 with an attachment 38 at its end and a piston head 40 slidably disposed therein are carried by the housing 30 which is sealed and filled with fluid in the conventional manner. The piston head 40 subdivides the chamber 31 into upper and lower portions 33 and 35, respectively.

FIGS. 5 and 6 show in detail the piston head 40, which has the vortex chamber 42 formed by a recess in the piston head 40 and an insert 44 which may be threadedly secured thereto as shown.

Communicating with the vortex chamber 42 are a plurality of control inlets 46 which are directed tangentially thereto, and which in turn are in communication with the chamber portion 35 under the piston head 40 via passages 48. Restrictions 50 are included in order to provide orifice type flow therethrough.

Also communicating with the vortex chamber 42 are a plurality of radially directed supply inlets 52, which likewise are in communication with the fluid beneath the piston head 40 via manifold passage 54. The radial supply passages are either sized or subdivided by means of small tubes so as to insure laminar flow therethrough in the operating pressure range of the device.

A central outlet 56 for the vortex chamber 42 is provided which is in communication with the chamber portion 33 above the piston head 42 via passages 58 in the piston rod 36.

The attachments 32, 38 are secured to the unsprung running gear and the vehicle frame, respectively, in the conventional manner.

In operation, shock loads tend to drive the piston downward relative to the housing 30 as viewed in FIG. 4, which creates a fluid pressure difference across the piston head 40, in turn causing fluid flow through the radial and tangential inlets 52, 46 respectively, through the vortex chamber 42 and into the chamber portion 33 above the piston head 42, via outlet 56. As described above, flow therethrough will be according to the curve of FIG. 1, since at low shock loads, a greater share of the flow will be through the tangential inlets 46 which creates a relatively high resistance to flow therethrough in the vortex chamber 42. At higher shock loads and resulting higher pressure differences, the relative share of the flow of the radial inlets increases and hence the flow rate through the vortex chamber 42 increases with increases in pressure differences at a much higher rate, thus providing the flattened characteristic flow desired.

Flow is reversed during the return stroke produced by the vehicle springs, and the flow then is via passages 58 through the vortex chamber 42 and the radial and tangential inlets 46, 52 to the lower chamber portion 35. This provides an advantageous result in that since vortical flow is not induced by flow into the vortex chamber 42 via the outlet 56, the resistance of the shock absorber is much lessened during the return stroke. This feature is more fully described in U.S. Pat. No. 3,362,508 assigned to the same assignee as the present invention.

From the above detailed description, it should be apparent that a fluid flow device has been provided which produces a nearly ideal pressure flow characteristic in a shock absorber without significantly increasing the cost or complexity thereof, and which does not adversely affect the reliability or maintainability of the shock absorber.

It should be appreciated that while this fluid flow device is particularly useful in this context, other uses thereof wherein a tailored pressure-flow characteristic is desired are within the scope of the invention.

Along this line, many variations are possible such as a reversal of the orifice and laminar restrictions to provide an extreme steepening of the pressure versus flow curve, or other combinations of restrictions or flow control elements could be used to create a particular desired pressure-flow characteristic.

What is claimed is:

1. A shock absorber for damping relative movements of a pair of structures comprising:

a housing member defining a chamber, and fluid substantially filling said chamber;

a piston disposed in said housing and slidable therein so as to divide said chamber into portions;

a fluid flow device carried by said piston and forming a fluid flow path connection through said piston, including a vortex valve disposed having radial and tangential inlets with connected passages communicating with one of said chamber portions and a central outlet with a connected passage communicating with the other chamber portion, and also including means for creating square-law flow through at least a portion of said passage connected to said tangential inlet for a range of pressure differences across said piston and means for creating laminar flow through at least a portion of said passage connected to said radial inlet in said pressure difference range; and means for drivingly connecting said piston to one of said structures and means drivingly connecting said housing to the other of said structures, whereby a tailored damping force is created by relative movement of said structures.

2. A shock absorber for damping relative movements of a pair of structures comprising:

a housing defining a chamber containing fluid;

a member disposed in said housing and fluid, and movable along a path therethrough, dividing said chamber into portions;

a plurality of fluid flow paths in said member disposed so that fluid flow tends to occur therethrough upon movement of said movable member along said path, at least two of said flow paths having different flow characteristics such that the relative share of the total combined flow occurring through said at least two of said flow paths varies in response to changes in the pressure difference thereacross;

fluid flow means having at least two inlets and a common outlet with the relationship between fluid flow and pressure difference across said at least two inlets and said common outlet for a given pressure difference varies with variations in the relative shares of the total flow carried by said inlets;

means providing a fluid connection with said at least two fluid flow paths with a respective one of said at least two inlets;

means for drivingly connecting said housing and said member with a respective structure, whereby relative movements therebetween are damped with a force characteristic that varies with the pressure difference created by relative movement of said member according to the fluid flow means flowpressure difference relationship.

3. The shock absorber of claim 2 wherein an increased relative share of flow by one of said at least two inlets of said fluid flow means causes an increased fluid flow through said fluid flow means for a given pressure difference, and wherein one of said at least two flow paths through which the relative share of flow increases upon an increase in pressure difference thereacross is connected to said one of said at least two inlets, whereby said flow rate-pressure difference relationship is flattened as said pressure difference increases.

4. The shock absorber of claim 3 wherein said at least two flow paths includes an orifice restriction in said one flow path and a laminar flow restrictor in the other of said at least two flow paths whereby different flow characteristics are provided.

5. The shock absorber of claim 3 wherein said fluid flow means comprises a vortex valve having a supply inlet, a control inlet, and an outlet and wherein said other of said fluid flow inlets comprises the supply inlet, said one of said inlets comprises said control inlet and said fluid flow outlet comprises said vortex valve outlet.

6. The shock absorber of claim 5 wherein said flow paths and said vortex valve form a flow path through said movable member, with said vortex valve outlet communicating with the housing chamber portion on one side of said member along said path and said at least two fluid flow paths communicating with the other chamber portion on the other side of said member along said path.

7. The shock absorber of claim 6 wherein said vortex valve outlet is disposed communicating with the chamber portion which is increased in volume by relative movements of said structures toward each other, whereby said movements are damped with higher forces than relative movements of said structures away from each other.

* * * * *